Patented Jan. 25, 1944

2,339,927

UNITED STATES PATENT OFFICE 2,339,927

PROCESS AND CATALYST FOR THE PREPARATION OF PREDOMINANT QUANTITIES OF PARAFFIN IN THE HYDROGENATION OF CARBON MONOXIDE

Heinrich Heckel, Dinslaken, Germany, assignor to Hydrocarbon Synthesis Corporation, New York, N. Y.

No Drawing. Application January 8, 1941, Serial No. 373,704. In Germany January 5, 1940

3 Claims. (Cl. 260—449.6)

It is known to carry out carbon monoxide hydrogenation by means of precipitated cobalt catalysts under synthesis pressures of 5–20 atm. superpressure, in order to obtain thereby an increase of paraffin hydrocarbons with a high boiling point. At best 40–50% of paraffin is so procurable.

It has been found that a much higher yield of very valuable paraffins of approximately 70–80% of the conversion products can be obtained if, instead of the present treatment, in the first place considerably higher percentages of cobalt are used in the catalyser and secondly manganese is used as activator.

The cobalt percentage of the catalysts which until now have been used for the paraffin synthesis has amounted to approximately 60–100 g. cobalt per liter of the catalyst mass.

The conversion catalyst to be used in accordance with the invention must contain at least 200 grams cobalt, preferably 300 grams cobalt or still more per liter. This high cobalt percentage is obtained by a corresponding decrease of the carrier mass. The cobalt catalysts used up to date contained approximately 100–250 parts of infusorial earth to 100 parts of cobalt. In contrast therewith, the new conversion contacts only contain 10–20 parts of infusorial earth to 100 parts of cobalt.

In addition to compounds of thorium and magnesium, those of manganese must also be included amongst the many metal compounds suggested as activators. However, it has not hitherto been known that, in using catalysts with an extremely high cobalt percentage, a predominant formation of paraffin with a high boiling point is obtained simply as the result of activating additions of manganese. Until now it has not been recognised that this formation of paraffin is chiefly dependent upon the kind of activator used, and that for such purpose manganese has extremely favourable properties.

The new catalysts, with a very high percentage of cobalt carbonate, a small quantity of infusorial earth and a corresponding addition of manganese, are extremely effective. They are much more active than all contact substances hitherto described for the present reactions. This is especially apparent from the fact that they bring about a complete conversion of the carbon monoxide-hydrogen mixture at the lowest reaction temperatures hitherto known. Even below 170° C. (338° F.), e. g. between 160° C. (320° F.) and 165° C. (329° F.), with these catalysts the usual yields are obtained from a synthesis gas consisting, for example, of one volume part of carbon monoxide to 2 volume parts of hydrogen. In consequence of the high activity and the low conversion temperature, a paraffin yield is obtained that is higher than has ever been procured hitherto.

The paraffin so obtained has very valuable properties. It may be remarked that in industry paraffin is not clearly defined, but is generally understood to refer to normally solid aliphatic hydrocarbons with a boiling point over 320° C. (608° F.), of which the higher molecular products are especially desired. Compared with the process applied hitherto, by means of the new catalyst the increased yield of paraffin is mainly obtained in the form of the highest molecular hydrocarbons. If the total paraffin obtained is separated by distillation into compounds boiling between 320° C. (608° F.) and 460° C. (860° F.) and compounds boiling at temperatures over 460° C. (860° F.), the new catalyst produces up to 50–60% of the liquid products in the form of paraffin with a boiling point over 460° C. (860° F.); whereas by using the catalysts described hitherto, only up to 30% of the liquid products consisted of paraffin with such a high boiling point.

The composition of the catalysts used, the conversion conditions, and the liquid reaction products appear from the following experiments.

*Example 1*

A catalyst, consisting of 100 parts Co and 15 parts Mn in the form of their carbonates, and 12.5 parts of roasted infusorial earth which had been purified with acid, was prepared in the following way:

25 grams Co and 3.75 grams Mn were, as nitrates, dissolved in 500 cc. water and heated to boiling point. The boiling solution was poured into a soda solution containing 61 grams soda in 750 cc. H2O, which had also been heated to the boiling point while stirring vigorously. Immediately after the precipitation 3.5 grams of roasted infusorial earth, which had been purified with acid, was stirred into the precipitate, The precipitate was sucked off on a vacuum filter and washed with 3 liters of hot water.

Thereupon the contact paste was carefully dried in the atmosphere at 75° C. (167° F.). After an hour's reduction with $H_2+H_2$ at 400° C. (752° F.) the catalyst was used with synthesis gas at a temperature of 160° C. (320° F.) and 10 atmospheres superpressure. The working temperature was raised to 175° C. (347° F.). The gas consumption was normal. It amounted to 10 liters of synthesis gas per 100 cc. of catalyst volume per hour. The average CO-conversion amounted to 75% and a yield of 120 grams per cubic meter of active gas was obtained.

The experiment lasted 5 months.

The composition of the liquid products obtained is shown in the following table:

|  | Working hours | | | |
| --- | --- | --- | --- | --- |
|  | 1-552 | 612-1090 | 1090-1720 | 1720-2240 |
|  | Per cent | Per cent | Per cent | Per cent |
| Gasoline up to 200° C. (392° F.) | 21.0 | 13.9 | 6.1 | 5.0 |
| Diesel oil 200°-320° C. (392°-608° F.) | 20.5 | 16.0 | 14.7 | 16.7 |
| Soft paraffin 320°-460° C. (608°-860° F.) | 25.8 | 22.9 | 23.8 | 21.5 |
| Hard paraffin over 460° C. (860° F.) | 32.7 | 47.2 | 55.4 | 56.8 |
| Total paraffin | 58.5 | 70.1 | 79.2 | 78.3 |

*Example 2*

A catalyst, consisting of 100 parts Co, 15 parts Mn, and 12.5 parts infusorial earth which had not been purified but had been roasted at 1000° C. (1832° F.), was prepared as described in the above. After an hour's reduction with $H_2$ at 400° C. (752° F.), 76 cc. of the catalyst were used with synthesis gas at a temperature of 160° C. (320° F.) and 10 atmospheres superpressure. In the course of 900 hours the temperature was raised to 164° C. (327° F.). The gas consumption amounted to 6-8 liter per hour. When the CO-conversion amounted to 75% and more, about 120-130 grams of total products per cubic meter active gas were obtained.

The average composition of the liquid products in the first 1000 working hours was as follows:

|  | Per cent |
| --- | --- |
| Gasoline up to 200° C. (392° F.) | 5.9 |
| Diesel oil 200°-320° C. (392°-608° F.) | 12.5 |
| Soft paraffin 320°-460° C. (608°-860° F.) | 22.6 |
| Hard paraffin over 460° C. (860° F.) | 59.2 |
| Total paraffin | 80.8 |

The application of the above catalysts is restricted to the superpressure synthesis, that is, to all technical gas pressures over 2 atmospheres absolute. The paraffin forming cobalt-manganese-infusorial-earth-catalysts are especially efficient at synthesis pressures of 5-50 atmospheres superpressure.

What I claim is:

1. In the process of producing hydrocarbon materials containing major proportions of normally solid constituents by passing gas mixtures consisting substantially of one volume of carbon monoxide and two volumes of hydrogen at elevated temperatures and pressures of 5-50 atmospheres over catalysts containing cobalt deposited on kieselguhr, the improvement which comprises carrying out the process in the presence of a catalyst containing about 100 parts by weight of cobalt, 15 parts by weight of manganese and 10 to 20 parts by weight of infusorial earth.

2. In the process of producing hydrocarbon materials containing major proportions of normally solid constituents by passing gas mixtures consisting substantially of one volume of carbon monoxide and two volumes of hydrogen at elevated temperatures and pressures of 5 to 50 atmospheres over catalysts containing cobalt deposited on kieselguhr, the improvement which comprises carrying out the process in the presence of a catalyst containing 100 parts by weight of cobalt, 15 parts by weight of manganese and 12½ parts by weight of infusorial earth.

3. The process according to claim 2 carried out at a temperature of from 160° to 175° C. and a pressure of about 10 atmospheres.

HEINRICH HECKEL.